United States Patent [19]
Zeidler

[11] Patent Number: 6,089,710
[45] Date of Patent: Jul. 18, 2000

[54] SINGLE-VISION OPHTHALMIC LENS SERIES

[75] Inventor: Robert R. Zeidler, Charlton, Mass.

[73] Assignee: Oracle Lens Manufacturing Corporation, Warwich, R.I.

[21] Appl. No.: 09/119,346

[22] Filed: Jul. 20, 1998

Related U.S. Application Data

[60] Provisional application No. 60/062,970, Oct. 16, 1997.

[51] Int. Cl.[7] .................................................. G02C 7/02
[52] U.S. Cl. .......................................... 351/159; 351/177
[58] Field of Search .................................. 351/159, 168, 351/177

[56] References Cited

U.S. PATENT DOCUMENTS

| | | |
|---|---|---|
| 3,434,781 | 3/1969 | Davis et al. . |
| 3,645,610 | 2/1972 | Duckwall et al. . |
| 3,877,798 | 4/1975 | Tolar et al. . |
| 4,008,031 | 2/1977 | Weber . |
| 4,091,057 | 5/1978 | Weber . |
| 4,310,225 | 1/1982 | Davis . |
| 4,364,878 | 12/1982 | Laliberte et al. . |
| 4,576,623 | 3/1986 | Mann ...................................... 351/177 |
| 4,664,854 | 5/1987 | Bakalar et al. . |
| 4,828,769 | 5/1989 | Maus et al. . |
| 4,867,553 | 9/1989 | Frieder . |
| 4,873,029 | 10/1989 | Blum . |
| 4,874,561 | 10/1989 | Spector . |
| 4,900,242 | 2/1990 | Maus et al. . |
| 4,933,119 | 6/1990 | Weymouth . |
| 5,323,192 | 6/1994 | Howland et al. ........................ 351/177 |
| 5,531,940 | 7/1996 | Gupta . |
| 5,859,685 | 1/1999 | Gupta et al. . |
| 5,861,934 | 1/1999 | Blum et al. . |

OTHER PUBLICATIONS

Jaile, "The Principles of Ophthalmic Lenses", The Association of British Dispensing Opticians, fourth edition pp. 412–467, 1988.

Davis et al, "The Design of a General Purpose Single Vision Lens Series", American Journal of Optometry & Archives of American Academy of Optometry, vol. 42(4), pp. 203–236, Apr., 1965.

Dowaliby, "Practical Aspects of Ophthalmic Optics", Professional Press Books, 3rd Edition, pp. 161–170, 1988.

Borish, "Clinical Refraction", Professional Press Books, 3rd Edition, pp. 1051–1059, 1970.

*Primary Examiner*—Scott J. Sugarman
*Attorney, Agent, or Firm*—Fish & Richardson P.C.

[57] ABSTRACT

A series of single-vision ophthalmic lenses for use in the correction of vision for myopia, hypermetropia, or astigmatism is described in which the series design is selected for the economic manufacture of, for example, thermoplastic ophthalmic lenses using injection molding. Injection molding methodology, when utilized appropriately, permits simplifications in the primary and secondary manufacture of ophthalmic lenses not usually practical when using other commonly-understood means of lens manufacture. Benefits of the lens series described include enhanced productivity of primary manufacture, improved cosmesis in certain types of secondary manufacture, and simplification of certain types of secondary manufacture that add further benefits to ophthalmic lenses following primary manufacture.

25 Claims, 3 Drawing Sheets

6,089,710

SINGLE-VISION OPHTHALMIC LENS SERIES

This application claims priority from application U.S. Ser. No. 60/062,970, filed Oct. 16, 1997.

BACKGROUND OF THE INVENTION

The invention relates to the design and manufacture of single-vision ophthalmic spectacle lenses.

Vision correction for myopia (nearsightedness) and hypermetropia (farsightedness) can be accomplished using spectacle lenses having appropriate spherical curves on the anterior (outer) and posterior (inner) surfaces. Astigmatism, with or without either of these errors, can be corrected if one of the surfaces is toroidal, or spherocylindrical, having different refractive powers or magnifications along two principal axes or meridians typically separated by 90 degrees. The toroidal surface can be placed on the posterior side of the lens. See, for example, M. Dowaliby, "Practical Aspects of Ophthalmic Optics," 3rd Edition, Chapter 6, New York: Professional Press Books, 1988. Corrective spectacle lenses utilize optical designs having appropriate curves, most typically in lens series, for which the anterior and posterior curves are set out in a manner that can permit efficacious manufacture without sacrificing optical correction.

A number of technologies exist for the manufacture of prescription lenses using corrective lens curves which can be related to the optical material being fabricated. Examples of optical materials include: (a) optical glass, for which the principal method of manufacture includes grinding and polishing of the lens surfaces; (b) thermosetting plastic monomers, such as allyl diglycol carbonate bis (CR-39®), for which the principal method of manufacture includes casting and curing the liquid monomer in a casting cell having a pair of optical quality casting molds with an apparatus for properly spacing the molds and retaining the monomer; and (c) thermoplastic materials such as polycarbonate (e.g., LEXAN®) or polymethyl methacrylate (PLEXIGLAS®), for which the principal method of manufacture includes injection molding of the thermoplastic resin, using heat and pressure to form the optical object in a molding cavity containing suitable optical quality molding surfaces.

The specific choice of anterior and posterior curves can affect the degree of satisfactory vision correction as perceived by the wearer. For example, M. Jalie, "The Principles of Ophthalmic Lenses," 4th Edition, Chapter 18, London: The Association of British Dispensing Opticians, 1988, describes in detail the effects of anterior and posterior curve selection on satisfactory vision correction. This approach to optical correction can result in a large number of unique anterior and posterior curves.

Ophthalmic prescription lenses can be manufactured using a posterior base curve series. In a posterior base curve series, the same posterior curve is used to prepare lenses over prescriptive ranges of 1 to 2 diopters while altering the anterior curves appropriately, typically in 0.25 diopter increments, to obtain the correct refractive power. The posterior base curve series method is a typical method of manufacturing prescription lenses in a one-step process where both anterior and posterior surfaces are provided as integral parts of the manufacturing process by the lens manufacturer. The completed article provided by the lens manufacturer to an optician is generally referred to as a finished uncut, indicating that the lens requires only proper rotational orientation for correction of astigmatism, if any, and machining of the edge to fit the patient's spectacle frame.

A degree of latitude exists regarding the value of the anterior curve for a specific prescriptive correction. The anterior curve of a prescriptive correction providing acceptable optics can vary by as much as ±1 diopter about a nominal value provided it has an appropriate posterior curve and central thickness to preserve correct refractive power. See, for example, I. M. Borish, "Clinical Refraction," 3rd Edition, Chapter 26, New York: The Professional Press, Inc., 1970, and J. K. Davis et al., "The Design of a General Purpose Single Vision Lens Series," *American Journal of Optometry & Archives of American Academy of Optometry*, 42(4):203–236 (1965).

The anterior surfaces for all prescriptions are spherical and the posterior surfaces can be either spherical or toroidal, the latter being used for astigmatism correction. See, for example, Davis, et al. U.S. Pat. No. 3,434,781. In one example, a finished single-vision lens series for spherical correction of myopia or hypermetropia, covering the range of +4.00 diopters to −8.00 diopters in 0.25 diopter steps, can utilize 49 unique anterior surface spherical curves combined properly with 6 unique posterior spherical curves when manufactured to acceptable limits of refractive power accuracy.

Spherical single-vision ophthalmic lens series of the anterior base curve type can follow the guidelines of anterior curve selection, as set out by, for example, Davis, *Journal of Optometry & Archives of American Academy of Optometry*, 42(4):203–236 (1965), and Borish, "Clinical Refraction," 3rd Edition, New York: The Professional Press, Inc., 1970, with different manufacturers selecting differing portions of each nominal anterior sphere power range. Typical selections of anterior curves tend to prefer the lower valued or flat portion of the allowable base curve range, to improve cosmetic appearance (e.g., cosmesis).

Under some circumstances, additional posterior toroidal surfaces can be required to correct for astigmatism as well as myopia or hypermetropia. For example, a full range of prescriptive lenses, correcting for 3 diopters of astigmatism, in addition to the aforementioned 13 diopters of sphere power for myopia or hypermetropia correction, incorporates 637 prescriptions or stock keeping units (SKUs). For each required posterior spherical surface, an additional 12 toroidal surfaces are required for the astigmatism correction range indicated.

SUMMARY OF THE INVENTION

The invention generally features a lens series having an anterior base curve design. The lenses can be single-vision lenses. The ophthalmic lens series includes a plurality of lenses. Each lens of the series has an anterior base curve disposed on an anterior surface and a posterior curve disposed on a posterior surface. Each lens can be a finished lens, although the lens series can include one or more semi-finished lenses. The lenses can be molded lenses of a thermoplastic optical material of a known refractive index, such as a polycarbonate.

An anterior base curve lens series design can permit a reduction in the total number of anterior curves relative to the number of anterior curves used in a posterior base curve design in the instance of injection molding manufacture of thermoplastic spectacle lenses.

Prescription lenses of the finished single-vision type can be manufactured to an anterior base curve design. Instead of maintaining the posterior curve constant over power steps in the range of 1 to 2 diopters while altering the anterior curves appropriately to obtain the correct refractive power, the reverse is done: the anterior curves are maintained over a similar refractive power range and the posterior curves are altered appropriately. Each anterior curve in a lens series that provides acceptable optical correction for prescriptions in the subject prescription range can vary as much as +/−1 diopter, with appropriate offsetting adjustments in posterior curves and lens thicknesses to preserve correct refractive power. An example of a series of semi-finished lens blanks of the anterior base curve type can have as few as 4, and typically no more than 6, unique anterior curves in order to cover an equivalent prescriptive range.

In one aspect, the invention features a ophthalmic lens system including a finished ophthalmic lens series and a semi-finished ophthalmic lens series of an anterior base curve design. The finished ophthalmic lens series includes a plurality of lenses, each lens including an anterior surface having an anterior base curve and a posterior surface having a posterior curve. The anterior base curve and posterior curve are curves of a finished ophthalmic lens series that spans a range of spherical prescriptive powers within a range of +6.00 diopters to −8.00 diopters. The series includes a group of lenses having a common anterior base curve. The group spans a diopter range of lens sphere power of between about 1.00 diopter and 2.00 diopters. The semi-finished ophthalmic lens series includes a plurality of lenses, each lens including an anterior surface having the anterior base curve of the finished lens series and a semi-finished posterior surface having a semi-finished posterior curve, for example, selected from a group consisting of 6 or fewer curves. The semi-finished surface can be an optically polished surface. The semi-finished ophthalmic lens series spans a range of spherical prescriptive powers within a range of +6.00 diopters to −8.00 diopters.

In another aspect, the invention features a method of manufacturing an ophthalmic lens. The method includes the steps of selecting an anterior mold insert having an anterior base curve selected from a group consisting of less than 10 curves, selecting a posterior mold insert having a posterior curve, assembling a mold cavity including the anterior mold insert and the posterior mold insert, providing a moldable optical material of known refractive index to the mold cavity to form the lens, and removing the lens from the mold cavity. The method can include the steps of: (a) selecting an anterior mold insert having an anterior base curve selected from a group consisting of less than 10 curves; (b) selecting a posterior mold insert having a posterior curve; (c) assembling a mold cavity including the anterior mold insert and the posterior mold insert; (d) providing a moldable optical material of known refractive index to the mold cavity to form a lens; (e) removing the lens from the mold cavity; and repeating steps (a)–(e). The posterior curve or the anterior base curve is changed such that each anterior base curve and posterior curve combination is used only once in the series. The posterior curve can be changed more often than the anterior base curve, (e.g., about five times for each anterior base curve) to generate the lens series. The mold cavity can include four pairs of anterior mold inserts and posterior mold inserts.

In another aspect, the invention features a set of mold inserts for manufacturing an ophthalmic lens series. The set includes an anterior mold insert having an anterior base curve selected from a group consisting of less than 10 curves and a posterior mold insert having a posterior curve, such that each lens of the series has a different spherical power and the series of lenses covers a prescription range ranging from +6.00 diopters to −8.00 diopters.

The anterior base curve is selected from a group consisting of less than 10 curves when the ophthalmic lens series spans a range of spherical prescriptive powers within a range of +6.00 diopters to −8.00 diopters. The anterior base curves can be spheric. The anterior base curve can be selected from a group consisting of less than 10 (e.g., 8, 7, or 6) curves when the ophthalmic lens series spans a range of spherical prescriptive powers within a range of +4.00 diopters to −8.00 diopters. A group of lenses having a common anterior base curve spans a diopter range of lens sphere power of between about 1.00 diopter and 2.00 diopters. The anterior base curve and the posterior curve can be selected such that the sphere powers of the lenses in the series differ by integral multiples of 0.25 diopters.

The posterior curve can be spherical, spherocylindrical, toroidal, or semi-finished. The posterior curve can include an astigmatic correction. The posterior curve can be selected from a group consisting of 50 or fewer curves, preferably 40 of fewer, most preferably 30 or fewer (e.g., 29). Alternatively, the posterior curve can be selected from the group consisting of 348 unique spherocylindrical or toroidal posterior inserts or 383 unique surfaces.

The lens series can include between 30 and 750 lenses. In preferred embodiments, the series includes between 30 and 50 lenses. In other preferred embodiments, the series includes between 250 and 350 lenses. In other preferred embodiments, the series includes between 600 and 750 lenses. More preferably, the series includes 33, 57, 297, 637, or 741 lenses.

A plurality of ophthalmic lens product lines, such as a finished single-vision series having a set of anterior spherical curves including an anterior base curve series, can be manufactured at minimum realizable optical insert capital cost. Additional product lines can be obtained by substituting one or more different sets of anterior surface curves and corresponding anterior surface mold inserts which can differ in optical design from the spherical anterior surfaces but which have substantially similar anterior base curve structures. The similar anterior base curve structures can increase the interchangeability of the set of posterior spherical, spherocylindrical, or toroidal curves and corresponding mold inserts. In addition, the anterior curves can be rotationally symmetric aspheric, multi-focal (e.g., bifocal or trifocal), or progressive addition (e.g., no-line bifocal) curves. New anterior curves, when combined with the existing posterior curves at correct lens thicknesses, can result in a desired product line.

The efficiency (e.g., time and cost) of manufacture of thermoplastic injection-molded single-vision ophthalmic lenses can be improved. Molding involves an interchange of optical molding inserts that form the anterior and posterior surfaces of a finished uncut lens series. In a finished uncut lens series, the interchange of posterior curve inserts can be made more readily than the interchange of anterior curve inserts. Thus, the posterior curves can be interchanged more frequently, reducing the number of curves in the plurality of anterior curves and increasing the number of curves in the plurality of posterior curves. This combination of pluralities of anterior and posterior curves can represent an example of an anterior base curve series of the invention.

The visual appearance of a pair of single-vision ophthalmic lenses can also be improved. For example, when one lens of the pair is molded to a first finished prescription and the other lens is molded using an identical anterior curve to a greater, semi-finished thickness, the semi-finished lens can be subsequently finished to a second finished prescription using standard laboratory surfacing techniques. The lenses of the resulting lens pair predictably have substantially identical anterior curves which are part of the single-vision lens series, thus improving the symmetry of the appearance of the lenses and the wearer's eye in use.

Under certain circumstances, an optometric dispenser can combine a finished single-vision lens (e.g., a finished uncut) for one eye of a patient with a second single-vision lens made from a semi-finished single-vision lens blank. Three frequently encountered circumstances include:

(a) A patient may have equal, or approximately equal, spherical errors in the two eyes, but the astigmatic error in one eye may exceed the cylinder range of the finished uncut series whereas the other does not. An anterior base curve finished lens series which has matching values and increments in its anterior curves to that of a series of semi-finished single-vision lens blanks can facilitate the relative ease of matching the frontal appearance of the pair of lenses in the finished eyewear.

(b) A patient may have a correctable ocular convergence problem in one of the two eyes, in combination with otherwise similar refractive errors in the two eyes requiring otherwise similar correction. An ocular convergence correcting amount of prism can be placed in a semi-finished single-vision lens blank for the affected eye. This prism corrected lens can be readily matched with a finished uncut having the same anterior curve for the eye unaffected by said lack of ocular convergence, resulting in finished eyewear having the same frontal appearance for the two eyes.

(c) A patient may have a large difference in refractive error between the two eyes, accompanied by a strongly dominant eye, a common occurrence when the refractive error difference is large. One accepted optometric practice in such instances is to prescribe correctly for the strongly dominant eye and to prescribe for best cosmetics for the weaker eye. The condition of best cosmetics, or matching frontal appearance, is readily obtained if the finished uncut and the semi-finished lens blank have identical anterior curves.

Cosmesis can also be improved. For example, anterior curve choice can favor selection of a lower-valued or flat portion of the nominal base curve range for the anterior sphere power, to improve cosmetic appearance of the lenses to an observer. Finished spectacle lenses can be provided with vacuum deposition anti-reflection (AR) coatings to suppress glare and multiple internal reflections when looking toward light sources, such as in night driving, as well as to suppress reflections from the anterior surfaces of the pair of lenses in finished eyewear to improve the cosmetic appearance of the eyewear. Anterior reflections can be most noticeable not only when AR coatings are absent but also when the anterior curves differ, offering reflected image size differences that draw attention to the lenses. AR coatings can suppress anterior reflections, but cannot eliminate the reflection size effect. The reflection size effect can only be satisfactorily eliminated when the two anterior curves are identical. Moreover, the AR coating deposition process can be improved in the instance that these surfaces have identical curvatures, permitting optimization of the coating process for the given batch.

Secondary manufacture of a pair of ophthalmic lenses can be simplified using the anterior base curve lens series design. The finished single-vision lens series can be adaptable to one or more types of secondary manufacture requiring subsequent mechanical or chemical alteration of the anterior surface of a finished single-vision lens, including but not limited to in-office fabrication of prescription multi-focals or secondary manufacture of chemically enhanced lenses such as photochromic lenses. The reduced number of anterior lens curves can facilitate the ease and reduce the expense related to secondary manufacture. An example of secondary manufacturing is the in-office multifocal, in which a finished single-vision lens can be modified to produce different final optical properties, viz., provision for correction of a combination of both distance (e.g., myopia, hypermetropia, or astigmatism) and near (e.g., presbyopia) refractive errors. Modification of anterior surfaces is described, for example, in Tolar et al. U.S. Pat. No. 3,877,798, Blum U.S. Pat. No. 4,873,029, and Frieder U.S. Pat. No. 4,867,553. Another example of anterior surface modification is described by Gupta U.S. Pat. No. 5,531,940, in which a layer of photochromic material is chemically bonded to the anterior surface of the lens. These methods of secondary manufacturing can be used more effectively with the finished single-vision lens series having a reduced number of anterior curves.

Spherical surfaces can be manufactured at lower cost than spherocylindrical or toroidal surfaces. Posterior base curve series designs, in which a relatively large number of anterior curve spheres reduces the total number of posterior curve torics, can be advantageously employed when the expense of the optical surface forming tooling is a measurable and significant portion of the total cost of manufacture. When casting and curing of thermosetting plastic ophthalmic lenses, casting molds are frequently damaged or broken, or otherwise have a relatively finite useful life. Costs for repair or replacement of casting molds, which can be as much as 10% of the total cost of goods, can be taken into consideration in the overall manufacturing cost budget. A posterior base curve series can reduce the expenses related to the repair or replacement of toroidal casting molds.

Unlike optical tooling utilized in glass or thermosetting plastic lens manufacture, optical tooling of lens molding inserts for injection-molded thermoplastic lenses can be considered capital assets rather than production expense items, due to their long life under conditions of reasonable treatment and care; under these conditions of operation, the amortized expense of the inserts can contribute slightly or negligibly to the overall manufacturing cost. Anterior base curve design can provide cost savings related to improved inventory management that results from improved and more flexible production scheduling. Flexible production scheduling can also result from a reduction in mold changeover time.

Other features and advantages of the present invention will be apparent from the following detailed description of the invention, and from the claims.

BRIEF DESCRIPTION OF THE DRAWINGS

FIG. 3A depicts a mold design in which anterior surface (concave) mold inserts are disposed on the cavity side of the mold. FIG. 3B depicts a mold design in which posterior surface (convex) inserts are disposed on the cavity side of the mold. In each of FIGS. 3A and 3B, the mold is shown in its closed (final post-coining) position and its open (parts removal/set-up changeover) position without coining present, to depict the relative degree of risk to insert damage during changeover for the two cases.

DESCRIPTION OF THE PREFERRED EMBODIMENTS

Figure 1:
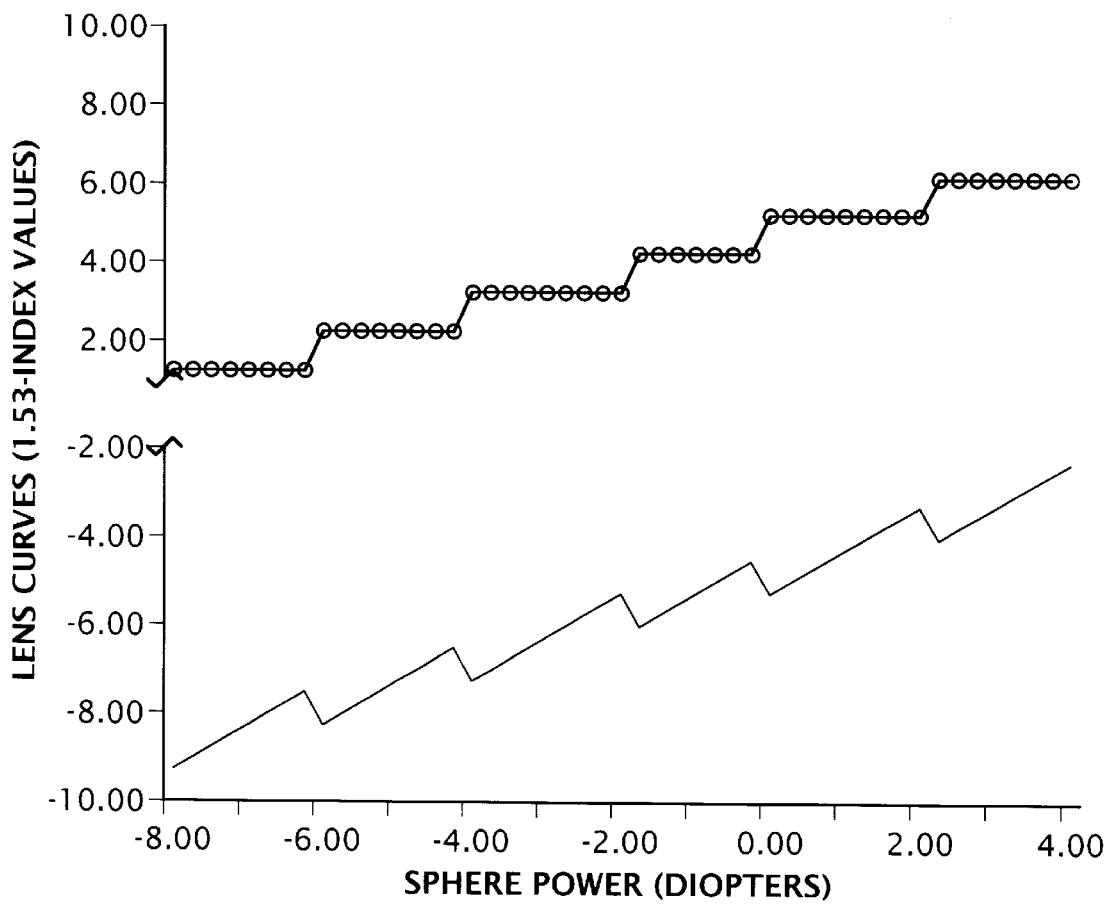
FIG. 1 depicts the anterior and posterior curves of the single-vision lens series based on an anterior base curve design, where the dioptric powers of the corrective prescriptions are related to the algebraic sum of the anterior and posterior curvatures. The finished uncut lenses in the series are depicted by the open circles, and prescription lenses made from semi-finished lens blanks having identical anterior curves are depicted by the solid line.

The invention features a finished single-vision lens series of the anterior base curve series type. The lenses of the series have anterior spherical surfaces and posterior spherical, spherocylindrical, or toroidal surfaces. The anterior and posterior surfaces are matched and spaced to cover a range of prescription powers. An example of a suitable anterior base curve series is depicted in FIG. 1. The number of unique posterior spherical curves is greater than the number of unique anterior spherical curves by a factor of about five, to give an anterior base curve series type.

The lens surfaces are produced by injection molding of a suitable thermoplastic optical polymer into a mold cavity. The mold cavity has cavity-side and core-side optical inserts that form the anterior and posterior surfaces, respectively, of the lenses in the series. In order to manufacture a large number of prescriptions at economic run quantities for inventory-management purposes when using lens-molding equipment having significantly fewer molding cavities than required prescriptions, rapid interchange of optical molding inserts can be employed. Rapid interchange is typically used in thermoplastic molding operations.

A number of manufacturing related factors can be considered when selecting and optimizing an ophthalmic lens series design for mass production by injection molding of thermoplastic optical polymers, including asset costs, efficient production scheduling of a large number of SKUs, and rapid interchange means for mold tooling. More specifically, some of the factors are described below.

1. The costs for production tooling, in the forms of capital assets and expendable, or expensed, tools, can be evaluated and controlled.

2. A large number of SKUs can be made, typically at very different rates of production that are consistent with customer demand dictated by the demographics of prescription distributions.

3. Economic run quantities are desired for inventory management purposes since there can be carrying costs associated with excess inventory, and other, potentially greater, costs associated with zero inventory (e.g., stock-outs).

4. For injection molded thermoplastic lenses, it is unlikely that all SKUs can be made simultaneously; to do so requires a large investment in production assets, which are likely to be underutilized. Typically, the ratio of the number of SKUs that can be produced at the same time to the total number of SKUs needed is small. The lost time consumed in changing over from a run of one (or more) SKUs to a new run of one (or more) SKUs must be taken into account if all SKUs cannot be made simultaneously. Means must be provided for to limit this time in order to satisfy (2) and (3) above.

5. The actual means for changeover from one run to the next run should not risk damage to the tools being used, and interchanged, for producing the complete range of SKUs consistent with (1) through (4) above.

The preferred embodiments satisfy the various possible optical fabrication and optometric objectives set out earlier. Without further elaboration, it is believed that one skilled in the art can, based on the description herein, utilize the present invention to its fullest extent. All publications cited herein are hereby incorporated by reference.

For cast thermoset lens manufacture, where casting molds have relatively brief useful life and are typically expensed in the cost of goods (at as much as 10% of this cost), relative expenses for repair or replacement of sphere and toric casting molds must be factored in. Spheric casting molds can be produced (and repaired and replaced) at lower cost than toroidal molds, and for this reason there is economic merit to a posterior base curve series design for manufacture of cast lenses. For molded thermoplastic lenses, the cost advantage of sphere tool fabrication is not necessarily advantageous. Unlike casting molds utilized in thermosetting plastic lens manufacture, optical inserts for injection molded lenses can be considered capital assets rather than production expense items, because they can be expected to have long life under conditions of reasonable treatment and care. With such conditions of operation, the amortized expense of these inserts contributes negligibly to the manufacturing cost budget. Determination of the optimal distribution of the anterior and posterior curves of a single-vision lens series for thermoplastic lens manufacturing can be made by establishing which of the two types of design is the more efficacious from the perspective of total manufacturing economics, including cost savings accruing from improved inventory management resulting from more flexible production scheduling. Flexible production scheduling can result from the ability make reductions in mold changeover time, which can be a significant production cost component for the usual case where the number of lens molding cavities is significantly fewer than the number of different SKUs that are needed to be produced.

A mold for the injection molding manufacture of ophthalmic lenses can have a single lens molding cavity or it may have a plurality of cavities. For example, a lens mold can have four cavities. Referring to FIG. 3, a mold is typically not symmetric about its parting line, the vertical dividing plane of the mold that separates the fixed part of the mold from the moveable part of the mold, permitting removal of parts when they have cooled to a satisfactorily reduced temperature. Referring to FIG. 3, the side of the mold affixed to the stationary machine platen closer to the injection barrel and auger is commonly known as the fixed or cavity side 10, and the apposite side affixed to the moveable machine platen is commonly known as the moveable or core side 20. The injection side of the mold allows for the introduction of the plasticized optical polymer through one or more injection nozzle tips that typically protrude into this injection or cavity side, thereby complicating the ability to remove and replace all or part of the mold cavity side. Complication in removal of this side of the mold is equivalent to complication, and delay, in the interchange of the concave (cavity) molding inserts that form the convex anterior surfaces of lenses in a single-vision lens series. This complication typically does not result, or results less frequently, on the core or moveable side of the mold.

A variety of methods are available to remove and replace all or part of the mold core side through, for example, a simple sliding motion. In one embodiment of sliding motion for a multi-cavity mold, such as a four-cavity mold, the core side of the mold frame can be configured so that half, or two, of the core side inserts can be removed as a unit by a simple sliding motion effected from one side of the molding machine. The other two core side inserts can be removed as a unit by a simple sliding motion effected from the opposite side of the molding machine. These insert bearing units (as well as similarly disposed insert bearing units on the cavity side of the mold, for which removal is made more complex due to injection nozzle proximity) can be provided in multiples, or at least duplicates, so that a majority of the set-up portion of the interchange activity is performed externally while production continues, eliminating the need for protracted periods of non-productivity. An absence, or relative absence, of complication in removal of the core side is equivalent to a lack, or relative lack, of delay in the interchange of the convex or core molding inserts that form the posterior spherical or toroidal surfaces of lenses in a single-vision lens series. The relative ease in the interchange of inserts forming the posterior surfaces of finished single-vision lenses, as compared with the more difficult interchange of inserts forming the anterior surfaces of these lenses, corresponds to an improvement in manufacturing efficiency through the implementation of an anterior base curve lens series.

Figure 3A:
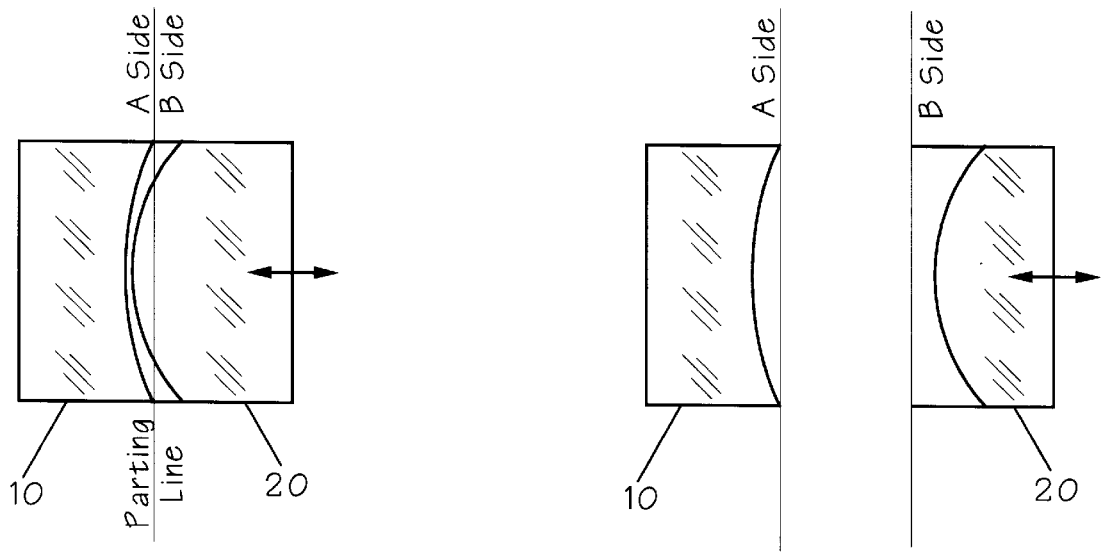
FIGS. 3A & 3B schematically depicts two lens mold designs.
Figure 3B:
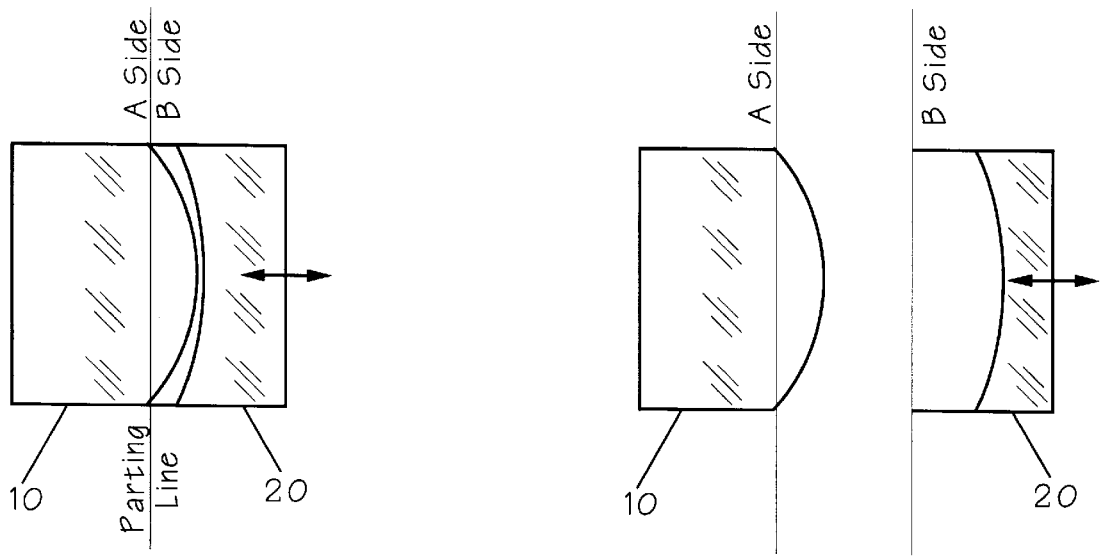

It is possible to design, construct and use a multi-cavity mold that swaps core side and cavity side inserts so that the convex (posterior surface) inserts typically disposed on the core side of the mold can be disposed on the cavity side of the mold, and vice versa, to simplify interchange of anterior surface inserts in an implementation of a posterior base curve lens series. A mold construction can have the convex inserts protruding past the mold parting line. FIG. 3B depicts this situation. In a mold open position, where sliding interchange of insert bearing units takes place, the convex inserts would be exposed and, hence, be at some risk of damage during the interchange process; for this reason, such a mold design is usually considered less typical, but can have advantages in conventional, non-quick-change molds. A more typical scenario is shown in FIG. 3A, which is implemented in the Examples.

Four additional matters can be considered in lens molding using a mold having a number of lens-molding cavities. In the Examples, there are four molding cavities, although the number of cavities can be greater than or less than four. The first matter relates to the issue of number of inserts needed to mold similar but non-identical lenses. A plurality of cavities in a single mold, where lenses of differing prescriptions have differing weights (or volumes), represents one example of a mold known as a family mold. For a multi-cavity family mold for lenses to be efficacious in a production sense, there must be a provision for simultaneously molding lenses of differing prescriptions, and, therefore, differing weights. A method of adjusting polymer material volume from cavity to cavity can be provided. In the absence of adjusting polymer volume, all of the cavities can have essentially the same volume, thereby requiring a multiplicity of identical sets of anterior and posterior inserts and decreasing the ability to achieve acceptable optical quality with acceptable flexibility in machine loading (e.g., production scheduling flexibility).

The second matter relates to the manner in which the cavity volume is controlled during the injection, or filling, and packing processes. Simple injection into a cavity, or a plurality of cavities, of constant volume can result in molding defects in the lenses. A coining process coincident with or following the injection phase of the process can avoid these defects by reducing the cavity volume to its final volume after having been at a somewhat larger volume during injection.

The third matter relates to the second matter, setting out means for varying cavity volumes to provide for coining. One method is to provide a sliding motion of the posterior core (convex) inserts, such that the inserts are initially set back some distance from the parting line prior to injection and are ultimately moved closer to the anterior cavity (concave) inserts at the conclusion of the injection and packing phases of the process to the final lens thickness.

The fourth matter relates to t he permissible cavity-to-cavity volume differences, and means for controlling material flow into the cavities, including coining of the material. The controls typically permit variations on the order of 10% or less. This can limit multi-cavity (here, four-cavity) lens molds to prescriptions that differ only modestly in refractive power. Various means, such as those described in Maus et al, U.S. Pat. No. 4,828,769, U.S. Pat. No. 4,900,242, Weymouth, U.S. Pat. No. 4,933,119, and Bakalar, U.S. Pat. No. 4,664,854, have been described for filling and packing an optical polymer material into a plurality of cavities of unequal volume, incorporating a means for coining the polymer during the injection and packing processes, and affecting the coining process by axial motion of the posterior inserts. These methods result in acceptable cavity-to-cavity volume differences to achieve equal and acceptably high molding quality in each of the plurality of cavities.

Example 1

Anterior and posterior base curve series designs are compared as Example 1 and Comparative Example 1 for thermoplastic lens manufacture.

Example 1 is a preferred embodiment of the invention having an anterior base curve design, shown in FIG. 1. Example 1 covers a like range of +4.00 diopters to −8.00 diopters in 0.25 diopter steps, and has 6 unique spherical anterior surf aces and 29 unique spherical posterior surfaces, for a total of 35 unique spherical surfaces. When correction for astigmatism is included to attain 637 SKUs, 348 posterior toric surfaces are required, for a total of 383 surfaces in appropriate combinations.

Figure 2:
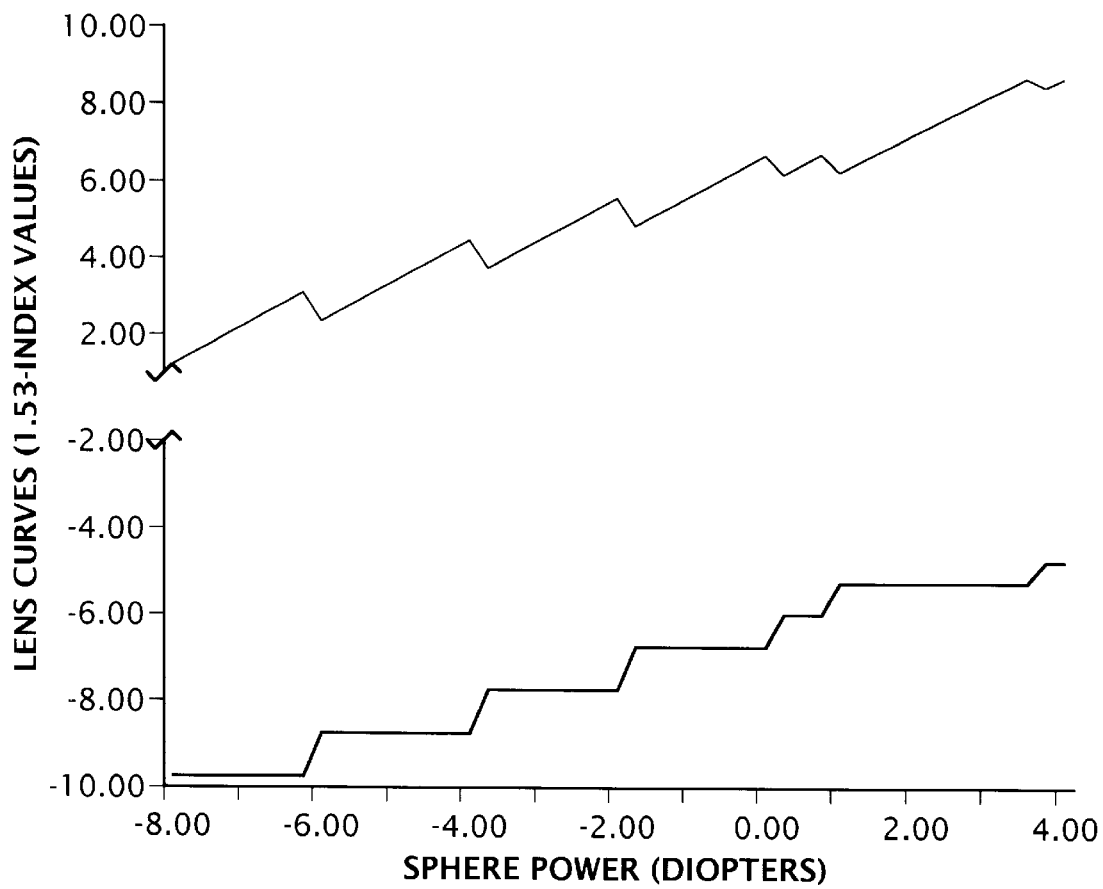
FIG. 2 depicts the anterior and posterior curves of Comparative Example 1, which is a posterior base curve design for a finished single-vision lens series for correction of myopia or hypermetropia, where the optical power of the curves is depicted in diopters of surface power and the dioptric power of the corrective prescription is related to the algebraic sum of the anterior and posterior curvatures.

Comparative Example 1 is a posterior base curve series is an embodiment of Davis, U.S. Pat. No. 3,434,781, covering the range of +4.00 diopters to −8.00 diopters in sphere correction in 0.25 diopter steps. The anterior surfaces for all prescriptions are spherical and the posterior surfaces are either spherical or toroidal, the latter being used for astigmatism correction. Comparative Example 1 is depicted in FIG. 2 and utilizes 49 unique anterior surface spherical curves combined properly with 6 unique posterior spherical curves. Astigmatism correction to 3.00 diopters in 0.25 diopter steps increases the number of posterior curves from 6 to 78, with each spherical curve accompanied by 12 toroidal curves of the same spherical curve value to provide the astigmatic correction in the indicated 0.25 diopter steps. The corrective range contains the 637 SKUs. The series requires a total of 127 unique anterior and posterior surfaces (49 anterior spheres, 6 posterior spheres, and 72 posterior torics) in appropriate combinations.

The manufacture of a restricted portion of the SKU range for Example 1 and Comparative Example 1 is described as an Example. For purposes of demonstrating the differences between the two types of base curves, the anterior base curve series design uses a single anterior spherical curve and the posterior base curve design uses a single posterior spherical curve. An example of such a range might extend from −2.25 diopter sphere/0.00 diopter cylinder to −4.00 diopter sphere/−2.00 diopter cylinder, leading to a total of 72 SKUs. In a four-cavity mold, this is equivalent to a minimum of 18 distinct set-ups, provided that the 4 SKUs in a set-up satisfy the criterion for good molding quality (i.e., that they differ by 10% or less by volume) and that they are needed in equal, or nearly equal, quantities. An exemplary production schedule is depicted in Table 1.

TABLE 1

| | 0.00 | −0.25 | −0.50 | −0.75 | −1.00 | −1.25 | −1.50 | −1.75 | −2.00 |
|---|---|---|---|---|---|---|---|---|---|
| −2.25 | 1400 | 425 | 600 | 175 | 150 | 175 | 125 | 125 | 100 |
| −2.50 | 1225 | 350 | 425 | 150 | 325 | 150 | 125 | 125 | 100 |
| −2.75 | 875 | 300 | 600 | 275 | 150 | 125 | 100 | 125 | 125 |
| −3.00 | 1350 | 300 | 600 | 300 | 250 | 200 | 150 | 100 | 125 |
| −3.25 | 900 | 275 | 450 | 150 | 150 | 150 | 100 | 100 | 100 |
| −3.50 | 875 | 150 | 375 | 150 | 150 | 150 | 100 | 100 | 100 |
| −3.75 | 850 | 150 | 350 | 225 | 125 | 100 | 100 | 125 | 100 |
| −4.00 | 725 | 150 | 325 | 150 | 125 | 100 | 100 | 100 | 100 |
| | | | | | | | Total Lenses in Plan: | | 20825 |
| | | | | | | Minimum No. of Impressions Needed: | | | 5207 |

In Table 1, cylinder values are displayed across the top, sphere values are displayed along the left hand side, and the entries in individual cells identify the quantities of lenses needed to satisfy the demand (which, as was set out earlier, may represent either a production forecast demand or demand due to a customer order). For the purpose of providing a straightforward numerical example, the distribution has been scaled so that the SKU of lowest demand is scheduled for a total of 100 lenses, and other SKUs are molded in proportion, rounded up in increments of 25 lenses, indicating that no SKU is made in excess of actual demand plus 25 lenses (e.g., unscheduled overage). Similar tables representing actual production demands in other circumstances may have different proportions and different permissible overages.

The data of Table 1, which are independent of optical design choice, indicate that a minimum of 5207 mold impressions (e.g., shots) is required to produce the 20825 lenses needed. The estimate does not include defective impressions. While it is reasonable to presume that the 20825 lenses can in fact be produced in 5207 shots, or some number of shots slightly greater than this number, ignoring defects, it will not be possible to produce all SKU's in the quantities shown unless multiple set-ups and interchanges are scheduled and used in a satisfactory combinatorial way, i.e., in a way that preserves the condition that maximum cavity-to-cavity weight imbalance be restricted to about 10% for reasons of molding perfection. A means for finding satisfactory combinatorial solutions that meet the demand requirements without quantity overage/underage, or with minimum overage, can be a schedule optimization algorithm. Alternatively, it can be the solution of a system of simultaneous equations that relate the unique and allowable set-ups to the needed lens quantities. A scheduling solution, by either means, is independent of optical design.

In order to produce this SKU range utilizing a comparative posterior base curve series design, the series can have the various anterior and posterior inserts set out in Table 2.

Table 2 is based on using a posterior curve based design discussed above (Comparative Example 1) and depicted in FIG. 2.

In order to produce this SKU range utilizing Example 1, the lenses of the anterior curve based design series have various anterior and posterior inserts set out in Table 3. This table is based on using a design (Example 1) of the type depicted in FIG. 1.

The anterior and posterior curves chosen for the two examples are similar to facilitate comparison of the optical designs. Mold insert sets needed for producing the individual SKUs are shown in the cells of Table 2 and Table 3. A shorthand notation is used to identify the curves of the various inserts. For the two numerical entries in each cell, the first number is the spherical power of the anterior insert expressed in units of surface power diopters, and the second number is the spherical power of the posterior insert expressed in the same units, where, for polycarbonate thermoplastic resin having a refractive index of 1.5855, Surface Power=585.5/Radius (in mm).

TABLE 2

|  | 0.00 | −0.25 | −0.50 | −0.75 | −1.00 | −1.25 | −1.50 | −1.75 | −2.00 |
|---|---|---|---|---|---|---|---|---|---|
| −2.25 | 3.995, 6.257 | 3.995, 6.257A | 3.995, 6.257B | 3.995, 6.257C | 3.995, 6.257D | 3.995, 6.257E | 3.995, 6.257F | 3.995, 6.257G | 3.995, 6.257H |
| −2.50 | 3.746, 6.257 | 3.746, 6.257A | 3.746, 6.257B | 3.746, 6.257C | 3.746, 6.257D | 3.746, 6.257E | 3.746, 6.257F | 3.746, 6.257G | 3.746, 6.257H |
| −2.75 | 3.499, 6.257 | 3.499, 6.257A | 3.499, 6.257B | 3.499, 6.257C | 3.499, 6.257D | 3.499, 6.257E | 3.499, 6.257F | 3.499, 6.257G | 3.499, 6.257H |
| −3.00 | 3.249, 6.257 | 3.249, 6.257A | 3.249, 6.257B | 3.249, 6.257C | 3.249, 6.257D | 3.249, 6.257E | 3.249, 6.257F | 3.249, 6.257G | 3.249, 6.257H |
| −3.25 | 3.000, 6.257 | 3.000, 6.257A | 3.000, 6.257B | 3.000, 6.257C | 3.000, 6.257D | 3.000, 6.257E | 3.000, 6.257F | 3.000, 6.257G | 3.000, 6.257H |
| −3.50 | 2.751, 6.257 | 2.751, 6.257A | 2.751, 6.257B | 2.751, 6.257C | 2.751, 6.257D | 2.751, 6.257E | 2.751, 6.257F | 2.751, 6.257G | 2.751, 6.257H |
| −3.75 | 2.502, 6.257 | 2.502, 6.257A | 2.502, 6.257B | 2.502, 6.257C | 2.502, 6.257D | 2.502, 6.257E | 2.502, 6.257F | 2.502, 6.257G | 2.502, 6.257H |
| −4.00 | 2.253, 6.257 | 2.253, 6.257A | 2.253, 6.257B | 2.253, 6.257C | 2.253, 6.257D | 2.253, 6.257E | 2.253, 6.257F | 2.253, 6.257G | 2.253, 6.257H |

TABLE 3

|  | 0.00 | −0.25 | −0.50 | −0.75 | −1.00 | −1.25 | −1.50 | −1.75 | −2.00 |
|---|---|---|---|---|---|---|---|---|---|
| −2.25 | 3,249, 5.512 | 3,249, 5.512A | 3,249, 5.512B | 3,249, 5.512C | 3,249, 5.512D | 3,249, 5.512E | 3,249, 5.512F | 3,249, 5.512G | 3,249, 5.512H |
| −2.50 | 3.249, 5.762 | 3.249, 5.762A | 3.249, 5.762B | 3.249, 5.762C | 3.249, 5.762D | 3.249, 5.762E | 3.249, 5.762F | 3.249, 5.762G | 3.249, 5.762H |
| −2.75 | 3.249, 6.012 | 3.249, 6.012A | 3.249, 6.012B | 3.249, 6.012C | 3.249, 6.012D | 3.249, 6.012E | 3.249, 6.012F | 3.249, 6.012G | 3.249, 6.012H |
| −3.00 | 3.249, 6.257 | 3.249, 6.257A | 3.249, 6.257B | 3.249, 6.257C | 3.249, 6.257D | 3.249, 6.257E | 3.249, 6.257F | 3.249, 6.257G | 3.249, 6.257H |
| −3.25 | 3.249, 6.507 | 3.249, 6.507A | 3.249, 6.507B | 3.249, 6.507C | 3.249, 6.507D | 3.249, 6.507E | 3.249, 6.507F | 3.249, 6.507G | 3.249, 6.507H |
| −3.50 | 3.249, 6.757 | 3.249, 6.757A | 3.249, 6.757B | 3.249, 6.757C | 3.249, 6.757D | 3.249, 6.757E | 3.249, 6.757F | 3.249, 6.757G | 3.249, 6.757H |
| −3.75 | 3.249, 7.007 | 3.249, 7.007A | 3.249, 7.007B | 3.249, 7.007C | 3.249, 7.007D | 3.249, 7.007E | 3.249, 7.007F | 3.249, 7.007G | 3.249, 7.007H |
| −4.00 | 3.249, 7.257 | 3.249, 7.257A | 3.249, 7.257B | 3.249, 7.257C | 3.249, 7.257D | 3.249, 7.257E | 3.249, 7.257F | 3.249, 7.257G | 3.249, 7.257H |

In each table cell, the letter following the surface power designation of the posterior insert is a further shorthand for describing the cylinder value for the toric surface. For example, 6.257 represents a spheric insert of surface power 6.257 diopters (radius of 93.58 mm), 6.257 A represents a toroidal insert having 0.25 diopters of cylinder power, 6.257B a toroidal insert having 0.50 diopters of cylinder, and so on.

For the posterior base curve series of Comparative Example 1 or a preferred embodiment of the anterior base curve series of Example 1, a schedule solution can be found consisting of the number of anterior set-ups and change overs (more time consuming) and posterior set-ups and change overs (less time consuming), as well as the total number of anterior and posterior inserts needed, including duplicates that are needed in order to best meet the by-SKU quantities of Table 1. One solution meeting the quantities in Table 1 requires 19 distinct set-ups for both Comparative Example 1 and Example 1. In Comparative Example 1, the 19 set-ups require 15 anterior insert interchanges and 26 posterior insert interchanges. The 19 set-ups require 31 posterior insert interchanges only, with no anterior insert interchanges needed, in Example 1. A summary of the relative costs, for direct costs of insert interchange and capital costs for inserts, between Comparative Example 1 and Example 1 is shown in Table 4.

TABLE 4

|  | Comparative Example 1 | Example 1 |
|---|---|---|
| Running Costs |  |  |
| No. of Anterior Changes: | 15 | 0 |
| Relative Time: | 30 | 0 |
| No. of Posterior Changes: | 26 | 31 |
| Relative time: | 26 | 31 |
| Total Relative Time: | 56 | 31 |
| Total Relative Cost of Time: | 1.00 | 0.55 |
| Asset Capital Costs |  |  |
| No. of Anterior Sphere Inserts: | 25 | 4 |
| No. of Posterior Sphere Inserts: | 5 | 11 |
| No. of Posterior Toric Inserts: | 9 | 24 |
| Total Number of Inserts: | 39 | 39 |
| Total Relative Insert Cost: | 28 | 31 |

In this comparison, costs are relative and are assigned according to the following scheme. The cost of time for interchange in Comparative Example 1, using 56 units of time, is chosen to be 1.00. On this scale, the relative cost of time for the same number of interchanges according to Example 1, using 31 units of time, is 0.55. In either case, the total number of changes needed to produce the schedule according to the demands of Table 1 exceeds the theoretical minimum of 18 mentioned earlier (72 SKUs produced in a four-cavity mold). This is because of the need to produce the 72 SKUs in the correct quantities as shown in Table 1, while at the same time being reasonably observant of the need to control cavity-to-cavity volume differences to about 10% of the average of the volumes.

The relative cost for spheric inserts is set at 37.5 times the interchange unit cost and the relative cost for toric inserts is set at 50 times the interchange unit cost. In the comparison, Example 1 requires three monetary units more in insert costs, but is about 0.5 monetary unit more efficient in set-up and change-over costs. No more than six sets of interchanges need to be made, according to Example 1, before the initially larger costs of asset capital are offset by the larger direct costs of interchange in Comparative Example 1.

Accordingly, a finished single-vision product of spherical design, incorporating the partial prescription range is described in Example 1. A suitably merchantable thermoplastic optical polymer can be used, such as a polycarbonate having a refractive index of 1.586, although it is understood by those knowledgeable in the field that other optical polymers, such as, for example, polymethyl methacrylate, can be suitable. For polycarbonate material of index 1.586, a finished single-vision lens series according to Table 5 can meet the conditions that define an anterior base curve series and meet acceptable optical power accuracy in the finished lenses.

TABLE 5

| Sphere Power | Anterior Radius | Posterior Radius |
|---|---|---|
| +4.00 | 94.70 | 251.83 |
| +3.75 | 94.70 | 228.18 |
| +3.50 | 94.70 | 208.66 |
| +3.25 | 94.70 | 192.16 |
| +3.00 | 94.70 | 177.75 |
| +2.75 | 94.70 | 165.54 |
| +2.50 | 94.70 | 154.89 |
| +2.25 | 94.70 | 145.54 |
| +2.00 | 111.84 | 177.75 |
| +1.75 | 111.84 | 165.54 |
| +1.50 | 111.84 | 154.89 |
| +1.25 | 111.84 | 145.54 |
| +1.00 | 111.84 | 137.02 |
| +0.75 | 111.84 | 129.61 |
| +0.50 | 111.84 | 122.88 |
| +0.25 | 111.84 | 116.82 |
| 0.00 | 111.84 | 111.26 |
| −0.25 | 137.60 | 129.61 |
| −0.50 | 137.60 | 122.88 |
| −0.75 | 137.60 | 116.82 |
| −1.00 | 137.60 | 111.26 |
| −1.25 | 137.60 | 106.22 |
| −1.50 | 137.60 | 101.61 |
| −1.75 | 137.60 | 97.39 |
| −2.00 | 137.60 | 93.58 |
| −2.25 | 180.21 | 106.22 |
| −2.50 | 180.21 | 101.61 |
| −2.75 | 180.21 | 97.39 |
| −3.00 | 180.21 | 93.58 |
| −3.25 | 180.21 | 89.98 |
| −3.50 | 180.21 | 86.66 |
| −3.75 | 180.21 | 83.57 |
| −4.00 | 180.21 | 80.69 |
| −4.25 | 259.88 | 89.98 |
| −4.50 | 259.88 | 86.66 |
| −4.75 | 259.88 | 83.57 |
| −5.00 | 259.88 | 80.69 |
| −5.25 | 259.88 | 78.00 |
| −5.50 | 259.88 | 75.49 |
| −5.75 | 259.88 | 73.13 |
| −6.00 | 259.88 | 70.91 |
| −6.25 | 466.53 | 78.00 |
| −6.50 | 466.53 | 75.49 |
| −6.75 | 466.53 | 73.13 |
| −7.00 | 466.53 | 70.91 |
| −7.25 | 466.53 | 68.83 |
| −7.50 | 466.53 | 66.86 |
| −7.75 | 466.53 | 65.01 |
| −8.00 | 466.53 | 63.25 |

Throughout Table 5, anterior and posterior radii have units of millimeters, and lens thicknesses, also in units of millimeters, are selected properly so as to obtain correct lens powers.

The finished single-vision lens series thus set out, covering the sphere range of +4.00 diopters to −8.00 diopters in 0.25 diopter increments, has 6 unique spherical anterior surfaces and 29 unique spherical posterior surfaces, for a total of 35 unique spherical surfaces. The lens thicknesses for specific optical polymers used can be chosen through calculation of posterior vertex powers, or the dispensed powers, which are equivalent to back focal lengths expressed in units of inverse meters or diopters. Correct posterior vertex powers, to accuracies of 0.01 diopter or better, are obtained for polycarbonate optical polymer of refractive index 1.586 when plus-powered lenses have diameters of 73 mm and edge thicknesses of 1.0 mm and minus-powered lenses have center thicknesses of 1.2 mm. In addition, the toric, or cross, curve radii needed for posterior inserts that produce lenses having cylinder power are related to the posterior sphere radii in Table 5, as shown by examples in Tables 2 and 3.

The finished lens series can cover, in addition to the aforementioned sphere power range, a cylinder range to 3.00 diopters in magnitude in 0.25 diopter increments, requiring an additional 348 (29×12) toroidal or spherocylindrical posterior surfaces. The total count of unique anterior and posterior surfaces for a total count of 637 prescriptions is 383, exceeding the value of 127 unique surfaces needed to define an equivalent posterior base curve series of equal prescriptive range. However, the optimum set of anterior and posterior inserts needed to manufacture an injection molded thermoplastic lens series of 637 prescriptions using a significantly smaller number of lens molding cavities, requiring frequent changeovers, at improved productivity and efficiency and consequent lower product cost, favors the anterior base curve design. When considering pluralities of inserts that are indicated so that set-ups have sufficient flexibility for production scheduling, the differences in capital outlay, if any, are more than offset by improvements in productivity, and the insert value amortization contribution to product cost is typically negligible.

When considering range extensions beyond the described +4.00 diopter to −8.00 diopter range set out in Table 5, the anterior base curve series can significantly reduce the incremental capital outlay to extend such a series, requiring only the incremental outlay for inserts covering one or more additional anterior base curves, of a properly chosen curvature and design to be combined with the set-out posterior curves, rather than a larger number of new anterior and posterior inserts as would be needed for the case of a posterior base curve design.

EXAMPLE 2

An aspheric lens series can be obtained using an anterior curve based design. Regardless of chosen lens curves or thicknesses or refractive indices of the intervening optical polymer medium, the anterior curves, otherwise having substantially the same central curvatures as those set out in Table 5 and otherwise designed to be combined with the posterior curves whose radii are shown in Table 5, can be of a rotationally symmetric aspheric type, or of a generalized, non-rotationally symmetric type, provided only that good optical correction is maintained throughout such an aspheric lens series.

When contemplating new products of similar or identical anterior base curve values but differing in the details of the optical design of the anterior surfaces, such as aspheric anterior surfaces of rotationally symmetric or generalized non-rotationally symmetric type, the anterior base curve series can lead to a reduction in incremental capital outlay to develop and manufacture such a new product, requiring an incremental outlay for a series of anterior inserts incorporating the appropriate product features, combined with the set-out posterior inserts. A posterior base curve design can lead to a larger number of new anterior and posterior inserts, at higher capital outlay.

An example of this synergistic economy can utilize rotationally symmetric aspheric inserts on the anterior side of the mold, at approximately 4 times the relative cost for spherical inserts. Table 6, which is similar to Table 5, shows the relative costs of asset capital for the anterior base curve optical design (Example 2) and a posterior base curve optical design (Comparative Example 2). In this example, the anterior inserts are aspherics and the posterior inserts remain as spherics and torics as in Table 5.

TABLE 6

|  | Comparative Example 2 | Example 2 |
| --- | --- | --- |
| Running Costs |  |  |
| No. of Anterior Changes: | 15 | 0 |
| Relative Time: | 30 | 0 |
| No. of Posterior Changes: | 26 | 31 |
| Relative time: | 26 | 31 |
| Total Relative Time: | 56 | 31 |
| Total Relative Cost of Time: | 1.00 | 0.55 |
| Asset Capital Costs |  |  |
| No. of Anterior Sphere Inserts: | 25 | 4 |
| No. of Posterior Sphere Inserts: | 5 | 11 |
| No. of Posterior Toric Inserts: | 9 | 24 |
| Total Number of Inserts: | 39 | 39 |
| Total Relative Insert Cost: | 78 | 40 |

In this example, the direct costs of interchange and the asset costs of inserts are greater for a Comparative Example 2 at the outset relative to Example 2. Accordingly, the anterior curve based design can include a series of rotationally symmetric finished single-vision lenses of the anterior base curve type of curve disposition having identical, or substantially similar, anterior curves as the finished lens series described in Table 5, with the concomitant advantages of, firstly, full utilization of a set of existing posterior inserts, and secondly, the aforementioned set-up and change-over efficiencies characteristic of the finished single-vision lens series. The anterior inserts need not be rotationally symmetric aspheres, but can also be generalized aspheres, as exemplified by progressive addition lenses such as no-line bifocals.

EXAMPLE 3

A series of semi-finished single-vision lens blanks having the same anterior curves as those listed in Table 5 can be fabricated. The semi-finished blanks differ from the series of finished single-vision lenses have sufficient thickness, or utility, to permit a range of prescriptions, more or less matching in sphere power, anterior curve-by-anterior curve, those sphere powers set out in Table 5. These two-step fabricated prescriptions can differ from the lenses molded directly to finished prescription either in range of cylinder power or in the presence of prism, while at the same time having the same anterior curves as the finished lenses. Accordingly, a series of semi-finished lenses can be prepared having identical, or substantially similar, anterior curves as the finished lens series described in Table 5. Again, the semi-finished lens series can utilize rotationally symmetric aspheric inserts as described earlier.

EXAMPLE 4

A series of single-vision lenses, substantially identical to those molded to finished prescription as per the lens series in Table 5, can be fabricated where the lenses can be subjected to a subsequent secondary manufacturing process to modify the anterior surfaces of the lenses. These processes can be physical or chemical processes that modify the surfaces of the lenses to alter the optical performance or the light transmissive characteristics of the lenses. Examples of secondary processes include anti-reflection coating processes, optical modification through a combination of mechanical and chemical methods, or transmissive modification through chemical methods. In each case, the post-manufacturing modifications are simplified in the anterior base curve series, allowing modifications at reduced cost.

Other Embodiments

From the above description, the essential characteristics of the present invention can be ascertained. Without departing from the spirit and scope thereof, various changes and modifications of the invention can be made to adapt it to various usages and conditions. For example, the finished lens and semi-finished lens embodiments can be extended to incorporate a larger range of prescriptions by adding suitable anterior and posterior curves while maintaining the fundamental relationship between the numbers of unique anterior and posterior spherical curves that defines both the sphere range of the series and the fact that the invention is an anterior base curve series. As another example, while the finished lens and semi-finished lens embodiments set out herein utilize an appropriate set of spherical anterior curves of like value for both embodiments, and either spherical or spherocylindrical (or toroidal) posterior curves for either embodiment, chosen for polycarbonate optical polymer having a refractive index of 1.586, other optical polymers of differing refractive indices can be used. As yet another example, the anterior curves can be of rotationally symmetric aspheric design or of arbitrary symmetry provided only that the finished product is a series of ophthalmic lenses wherein the number of posterior curves is measurably greater than the number of anterior curves, said grouping of curves representing an anterior base curve lens series. Other embodiments are within the claims.

What is claimed is:

1. An ophthalmic lens series comprising a plurality of unitary lenses formed of an optical material of known refractive index, each lens having an anterior surface characterized by an anterior base curve and a posterior surface characterized by a posterior curve, the anterior base curve being selected from a group consisting of less than 10 curves; and
    wherein the ophthalmic lens series spans a range of spherical prescriptive powers within a range of +6.00 diopters to –8.00 diopters, and the series comprises a group of lenses having a common anterior base curve, the group spanning a diopter range of lens sphere power of between about 1.00 diopter and 2.00 diopters.

2. The lens series of claim 1, wherein the anterior base curves are spheric.

3. The lens series of claim 1, wherein the anterior base curve is selected from a group consisting of 8 or fewer curves and the lens series spans a range of spherical prescriptive powers within a range of +4.00 diopters to –8.00 diopters.

4. The lens series of claim 1, wherein the anterior base curve is selected from a group consisting of 7 or fewer curves and the lens series spans a range of spherical prescriptive powers within a range of +4.00 diopters to –8.00 diopters.

5. The lens series of claim 1, wherein the anterior base curve is selected from a group consisting of 6 or fewer spheric curves.

6. The lens series of claim 1, wherein each lens is a finished lens.

7. The lens series of claim 1, wherein the lens series includes a semi-finished lens.

8. The lens series of claim 1, wherein the posterior curve is spherical, spherocylindrical, or toroidal.

9. The lens series of claim 1, wherein the posterior curve further includes an astigmatic correction.

10. The lens series of claim 1, wherein the posterior curve is selected from a group consisting of 30 or fewer spheric curves.

11. The lens series of claim 1, wherein the anterior base curve is selected from a group consisting of 6 or fewer curves and the posterior curve is selected from a group consisting of 30 or fewer spheric curves.

12. The lens series of claim 1, wherein the anterior base curve and the posterior curve are selected such that the sphere powers of the lenses in the series differ by integral multiples of 0.25 diopters.

13. The lens series of claim 1, wherein the lenses are molded thermoplastic lenses.

14. The lens series of claim 1, wherein the optical material is a polycarbonate.

15. An ophthalmic lens system comprising:
    A) a finished ophthalmic lens series comprising a plurality of unitary lenses formed of an optical material of known refractive index, each lens having an anterior surface characterized by an anterior base curve and a posterior surface characterized by a posterior curve, the anterior base curve being selected from a group consisting of less than 10 curves and the posterior curve being selected from a group consisting of less than about 40 curves, wherein the finished ophthalmic lens series spans a range of spherical prescriptive powers within a range of +6.00 diopters to –8.00 diopters, and the series comprises a group of lenses having a combination of one anterior base curve and each of the finished posterior curves, the group spanning a diopter range of lens sphere power of between about 1.00 diopter and 2.00 diopters; and
    B) a semi-finished ophthalmic lens series comprising a plurality of lenses formed of an optical material of known refractive index, each lens having an anterior surface having the anterior base curve selected from a group consisting of less than 8 spheric curves and a semi-finished posterior surface having a semi-finished posterior curve selected from a group consisting of 6 or fewer spheric curves, wherein the semi-finished ophthalmic lens series spans a range of spherical prescriptive powers within a range of +6.00 diopters to –8.00 diopters.

16. A method of manufacturing a unitary ophthalmic lens, the method comprising:
    selecting an anterior mold insert characterized by an anterior base curve selected from a group consisting of less than 10 curves;
    selecting a posterior mold insert characterized by a posterior curve;
    assembling a mold cavity including the anterior mold insert and the posterior mold insert;
    providing a moldable optical material of known refractive index to the mold cavity to form the lens; and removing the lens from the mold cavity,
    wherein the anterior base curve and posterior curve are curves of an ophthalmic lens series that spans a range of spherical prescriptive powers within a range of +6.00 diopters to –8.00 diopters and the series comprises a group of lenses having a common anterior base curve, the group spanning a diopter range of lens sphere power of between about 1.00 diopter and 2.00 diopters.

17. A method of manufacturing an ophthalmic lens series comprising unitary lenses, the method comprising:
    (a) selecting an anterior mold insert characterized by an anterior base curve selected from a group consisting of less than 10 curves;
    (b) selecting a posterior mold insert characterized by a posterior curve;
    (c) assembling a mold cavity including the anterior mold insert and the posterior mold insert;
    (d) providing a optical material of known refractive index to the mold cavity to form a lens;

(e) removing the lens from the mold cavity; and repeating steps (a)–(c), wherein the posterior curve or the anterior base curve is changed such that each anterior base curve and posterior curve combination is used only once in the series, whereby each lens of the series has a different spherical power and the series of lenses covers a prescription range ranging from +6.00 diopters to −8.00 diopters.

18. The method of claim 17, wherein the posterior curve is changed more often than the anterior base curve.

19. The method of claim 18, wherein the posterior curve is changed about five times for each anterior base curve to generate the lens series.

20. The method of claim 17, wherein the mold cavity includes four pairs of anterior mold inserts and posterior mold inserts.

21. A method of improving the appearance of a pair of single-vision unitary ophthalmic lenses, the method comprising:

providing a finished lens characterized by an anterior base curve, wherein the finished lens includes an injection molded thermoplastic optical polymer and has a first finished prescription;

providing a semi-finished lens having the anterior base curve of the finished lens, wherein the semi-finished lens includes an injection molded thermoplastic optical polymer and has a semi-finished thickness; and finishing the semi-finished lens to a second finished prescription, wherein the anterior base curve is selected from a group consisting of 10 curves.

22. A method of improving the simplicity of secondary manufacture of a pair of ophthalmic lenses, the method comprising:

providing a pair of lenses from an ophthalmic lens series comprising a plurality of unitary lenses formed of an optical material of known refractive index, each lens having an anterior surface characterized by an anterior base curve and a posterior surface characterized by a posterior curve, the anterior base curve being selected from a group consisting of less than 8 curves, wherein the ophthalmic lens series spans a range of spherical prescriptive powers within a range of +4.00 diopters to −8.00 diopters, and the pair of lenses have the same anterior base curve; and modifying the anterior surface of each lens to produce optical components having modified optical characteristics.

23. The method of claim 22, wherein the lenses in the lens series include an optical polymer.

24. The method of claim 23, wherein the optical polymer is a polycarbonate.

25. A set of mold inserts for manufacturing an ophthalmic lens series of unitary lenses, the set comprising:

an anterior mold insert having an anterior base curve selected from a group consisting of less than 10 curves; and a posterior mold insert having a posterior curve;

wherein each lens of the series has a different spherical power and the series of lenses covers a prescription range from +6.00 diopters to −8.00 diopters.

* * * * *